US012545540B2

(12) United States Patent
Sato

(10) Patent No.: US 12,545,540 B2
(45) Date of Patent: Feb. 10, 2026

(54) POST-PROCESSING APPARATUS

(71) Applicant: KONICA MINOLTA, INC., Tokyo (JP)

(72) Inventor: Ryuji Sato, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 207 days.

(21) Appl. No.: 18/199,854

(22) Filed: May 19, 2023

(65) Prior Publication Data

US 2023/0416033 A1 Dec. 28, 2023

(30) Foreign Application Priority Data

Jun. 22, 2022 (JP) ................................ 2022-100712

(51) Int. Cl.
*B65H 9/08* (2006.01)
*B65H 9/06* (2006.01)
*G03G 15/00* (2006.01)

(52) U.S. Cl.
CPC ................ *B65H 9/08* (2013.01); *B65H 9/06* (2013.01); *G03G 15/6582* (2013.01); *G03G 15/70* (2013.01); *B65H 2405/52* (2013.01); *B65H 2553/412* (2013.01)

(58) Field of Classification Search
CPC ........ B65H 9/08; B65H 9/06; B65H 2405/52; G03G 15/6582
See application file for complete search history.

(56) References Cited

U.S. PATENT DOCUMENTS

| | | | | |
|---|---|---|---|---|
| 6,361,036 B1 * | 3/2002 | Nakazawa | B26D 7/015 | 83/167 |
| 8,109,497 B2 * | 2/2012 | Okamoto | B65H 45/18 | 270/32 |
| 8,469,347 B2 * | 6/2013 | Hata | B42C 9/0025 | 399/407 |
| 2007/0063424 A1 * | 3/2007 | Yahata | B65H 35/00 | 271/127 |
| 2012/0018948 A1 * | 1/2012 | Oshima | B65H 29/70 | 271/302 |

FOREIGN PATENT DOCUMENTS

| | | | |
|---|---|---|---|
| JP | 2005138972 A * | 6/2005 |
| JP | 4095341 B2 | 6/2008 |
| JP | 4746946 B2 | 8/2011 |
| JP | 2013-237538 A | 11/2013 |

* cited by examiner

*Primary Examiner* — Howard J Sanders
(74) *Attorney, Agent, or Firm* — Squire Patton Boggs (US) LLP

(57) ABSTRACT

A post-processing apparatus includes a movable portion and an opposing portion that are arranged to be opposite to each other with a conveyance path through which a sheet is conveyed interposed between the movable portion and the opposing portion, and a restricting member that has a holding surface including an abutment surface against which a sheet abuts, is capable of changing a posture between a first posture in which the holding surface closes the conveyance path and a second posture in which a clearance is formed in at least part of the conveyance path and is attached to a side where the opposing portion is located with respect to the conveyance path, wherein the movable portion processes a sheet positioned at the abutment surface by the restricting member having the first posture by moving toward the opposing portion.

7 Claims, 12 Drawing Sheets

POST-PROCESSING APPARATUS

The entire disclosure of Japanese patent Application No. 2022-100712 filed on Jun. 22, 2022 is incorporated herein by reference in its entirety.

BACKGROUND

Technological Field

The present invention relates to a post-processing apparatus mounted in an image forming apparatus.

Description of the Related Art

A post-processing apparatus that is mounted in an image forming apparatus represented by an MFP (Multi Function Peripheral) and executes post-processing such as punching of a sheet on which an image is formed by the MFP has been known.

Japanese Patent Laid-Open No. 2013-237538 describes a post-processing apparatus including a punch unit, a shift roller unit and an abutment member. The sheet conveyed by the shift roller unit abuts against the abutment member, and the sheet abutting against the abutment member is punched by the punch unit. In the punch unit, when a punch support shaft is moved in the up-and-down direction by engagement with a groove of a reciprocating punch cam, a punch blade is moved in the up-and-down direction together with the punch support shaft 62 and inserted into a die. The punch cam, the punch support shaft and the punch blade, other than the die of the punch unit, are arranged above the conveyance path through which a sheet is conveyed. Further, the abutment member is arranged above the conveyance path at a position farther upstream than the punch unit.

However, in the post-processing apparatus described in Japanese Patent Laid-Open No. 2013-237538, because the abutment member is arranged above the conveyance path, a sheet passes below the abutment member. Therefore, the sheet may be pressed downwardly by the abutment member in the conveyance path, and the tip of the sheet may be caught by die. There is a problem that the sheet may be jammed in the conveyance path.

SUMMARY

According to one aspect of the present invention, post-processing apparatus includes a movable portion and an opposing portion that are arranged to be opposite to each other with a conveyance path through which a sheet is conveyed interposed between the movable portion and the opposing portion, and a restricting member that has a holding surface including an abutment surface against which a sheet abuts, is capable of changing a posture between a first posture in which the holding surface closes the conveyance path and a second posture in which a clearance is formed in at least part of the conveyance path, and is attached to a side where the opposing portion located with respect to the conveyance path, wherein the movable portion processes a sheet positioned at the abutment surface by the restricting member having the first posture by moving toward the opposing portion.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
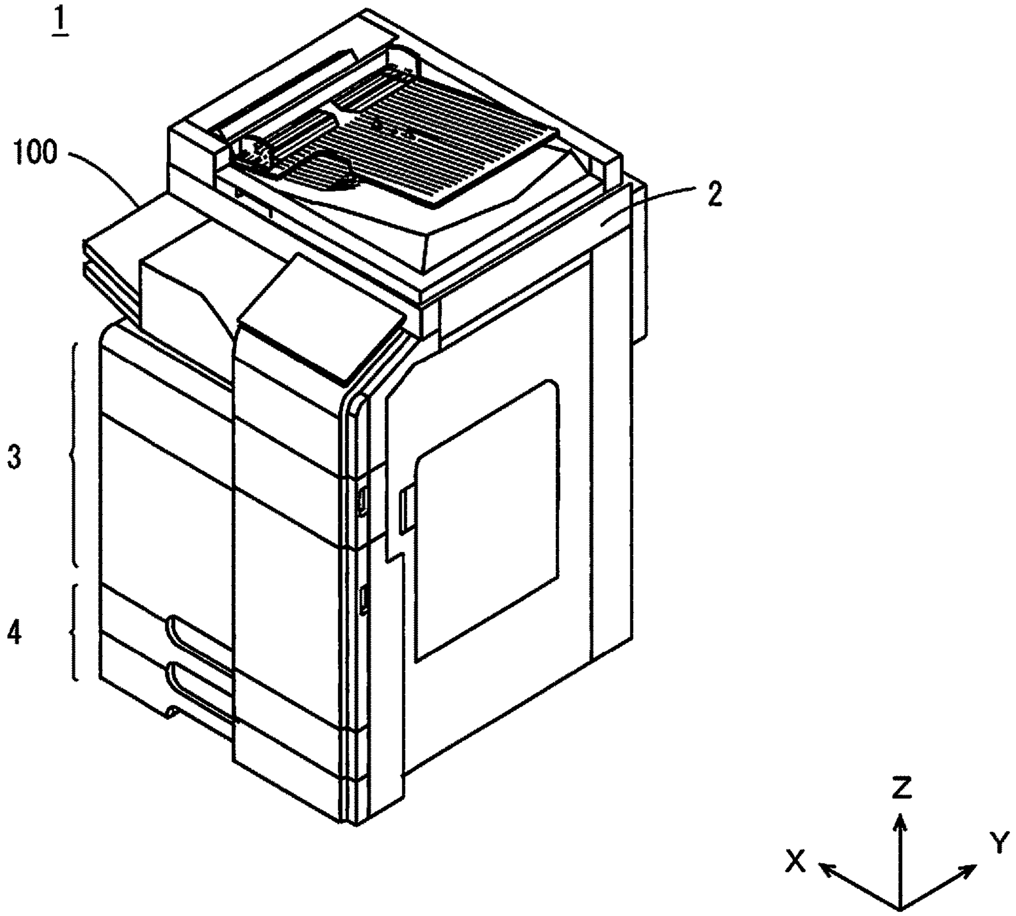
FIG. 1 is a first perspective view showing the appearance of an MFP in one embodiment of the present invention.

Hereinafter, one or more embodiments of the present invention will be described with reference to the drawings. However, the scope of the invention is not limited to the disclosed embodiments.

Embodiments of the present invention will be described below with reference to the drawings. In the following description, the same parts are denoted with the same reference characters. Their names and functions are also the same. Therefore, a detailed description thereof will not be repeated.

FIG. 1 is a first perspective view showing the appearance of an MFP in one embodiment of the present invention. With reference to FIG. 1, the MFP (Multi Function Peripheral) 1 is one example of an image forming apparatus. Here, an X-direction, a Y-direction and a Z-direction which are orthogonal to one another are defined. The X direction and the Y direction are parallel to a horizontal plane. In the Y direction, the direction directed from the rear surface toward the front surface of the MFP 1 (the direction directed from a positive position toward a negative position in the Y direction) is referred to as a front-surface direction, and the horizontal direction directed from the front surface toward the rear surface (the direction directed from a negative position toward a positive position in the Y direction) is referred to as a rear-surface direction.

Figure 2:
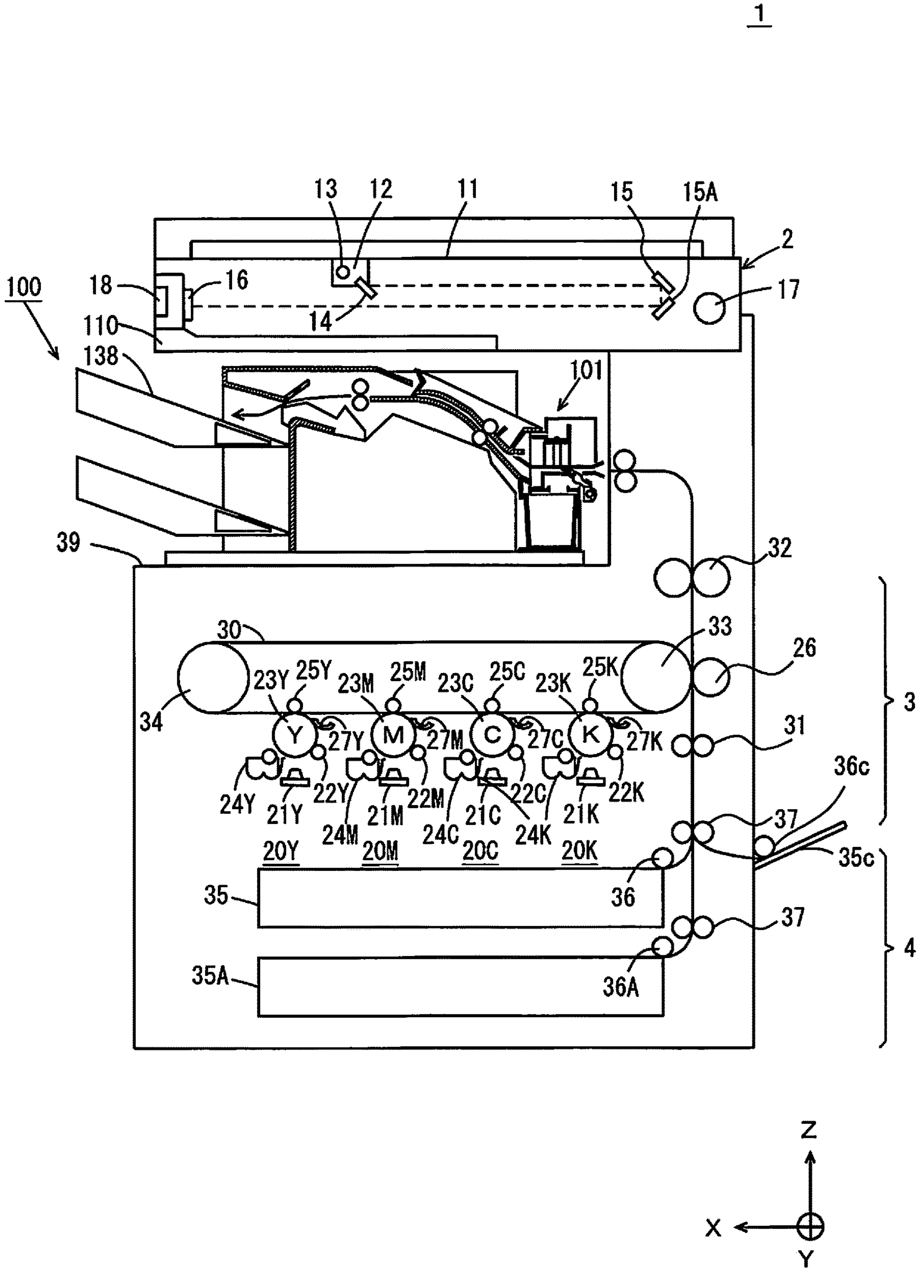
FIG. 2 is a cross sectional view schematically showing one example of the inner configuration of the MFP.

FIG. 2 is a cross sectional view schematically showing one example of the inner configuration of the MFP. With reference to FIGS. 1 and 2, the MFP 1 includes a document reading section 2 for scanning a document, an image forming section 3 for forming an image on a sheet (paper) based on image data, a sheet feed section 4 for supplying a sheet to the image forming section 3 and a post-processing apparatus 100 for executing post-processing on a sheet on which an image is formed.

The document reading section 2 exposes an image of a document set on a document glass 11 with an exposure lamp 13 attached to a slider 12 moving below the document glass 11. Light reflected from the document is guided to a lens 16 by a mirror 14 and two reflecting mirrors 15, 15A, and forms an image in a CCD (Charge Coupled Devices) sensor 18.

The reflected light that has formed an image in the CCD sensor 18 is converted in the CCD sensor 18 into image data as an electric signal. The image data is converted into print data of cyan (C), magenta (M), yellow (Y) and black (K) and is output to the image forming section 3.

The image forming section 3 includes respective image forming units 20Y, 20M, 20C, 20K for respective yellow, magenta, cyan and black. Here, "Y," "M," "C" and "K" represent yellow, magenta, cyan and black, respectively. An image is formed by driving of at least one of the image forming units 20Y, 20M, 20C, When all of the image forming units 20Y, 20M, 20C, 20K are driven, a full color image is formed. The printing data for yellow, magenta, cyan and black are respectively input to the image forming units 20Y, 20M, 20C, 20K. The only difference among the image forming units 20Y, 20M, 20C, 20K is the color of toner used by the image forming units 20Y, 20M, 20C, 20K. Therefore, the image forming unit 20Y for forming an image in yellow will be described here.

The image forming unit 20Y includes an exposure device 21Y to which the printing data for yellow is input, a photosensitive drum 23Y serving as an image bearing member, a charging roller 22Y for uniformly charging the surface of the photosensitive drum 23Y, a developing device 24Y and a primary transfer roller 25Y for transferring a toner image formed on the photosensitive drum 23Y onto an intermediate transfer belt 30 serving as an image bearing member using the effect of an electric field force.

Around the photosensitive drum 23Y, the charging roller 22Y, the exposure device 21Y, the developing device 24Y, the primary transfer roller 25Y and a drum cleaning blade 27Y are arranged in this order in the rotation direction of the photosensitive drum 23Y.

After being electrically charged by the charging roller 22Y, the photosensitive drum 23Y is irradiated with laser light emitted by the exposure device 21Y. The exposure device 21Y exposes a portion corresponding to an image on the surface of the photosensitive drum 23Y. Thus, an electrostatic latent image is formed on the photosensitive drum 23Y. Subsequently, the developing device 24Y develops the electrostatic latent image formed on the photosensitive drum 23Y with the charged toner. Specifically, toner is placed on the electrostatic latent image formed on the photosensitive drum 23Y by the effect of an electric field force, so that the toner image is formed on the photosensitive drum 23Y. The toner image formed on the photosensitive drum 23Y is transferred onto the intermediate transfer belt 30 serving as an image bearing member by the primary transfer roller 25Y with use of the effect of an electric field force. The toner remaining on the photosensitive drum 23Y without being transferred is removed from the photosensitive drum 23Y by the drum cleaning blade 27Y.

On the other hand, the intermediate transfer belt 30 is suspended by a driving roller 33 and a driven roller 34 so as not to loosen. When the driving roller 33 rotates in the counterclockwise direction in FIG. 2, the intermediate transfer belt 30 rotates in the counterclockwise direction in the diagram at a predetermined speed. The driven roller 34 rotates in the counterclockwise direction as the intermediate transfer belt 30 rotates.

Thus, the image forming units 20Y, 20M, 20C, 20K sequentially transfer toner images onto the intermediate transfer belt 30. Timing for transferring toner images onto the intermediate transfer belt 30 by the respective image forming units 20Y, 20M, 20C, 20K is adjusted based on detection of a reference mark provided on the intermediate transfer belt 30. Thus, toner images in yellow, magenta, cyan and black are superimposed on the intermediate transfer belt 30.

The toner images formed on the intermediate transfer belt 30 are transferred onto a sheet with the effect of an electric field force by a secondary transfer roller 26 serving as a transfer member. The sheet conveyed by a timing roller 31 is conveyed to a nip portion in which the intermediate transfer belt 30 and the secondary transfer roller 26 come into contact with each other. The sheet to which toner images are transferred is conveyed to a fixing roller 32 to be heated and pressurized by the fixing roller 32. Thus, the toner is fused and fixed to the sheet. Thereafter, the sheet is conveyed to the post-processing apparatus 100.

In sheet feed cassettes 35, 35A, sheets in different sizes are respectively set. The sheets respectively stored in the sheet feed cassettes 35, 35A are supplied to a conveyance path by pickup rollers 36, 36A respectively attached to the sheet feed cassettes 35, 35A and are sent to the timing roller 31 by a sheet feed roller 37.

While driving all of the image forming units 20Y, 20M, 20C, 20K in a case in which forming a full-color image, the MFP 1 drives any one of the image forming units 20Y, 20M, 20C, 20K in a case in which forming a monochrome image. It is also possible to form an image by combining two or more of the image forming units 20Y, 20M, 20C, 20K. While using a tandem-system including the image forming units 20Y, 20M, 20C, 20K that respectively form toner on a sheet in four colors by way of example, the MFP 1 may use a four-cycle system that sequentially transfers the toner of four colors onto a sheet using one photosensitive drum.

Figure 3:
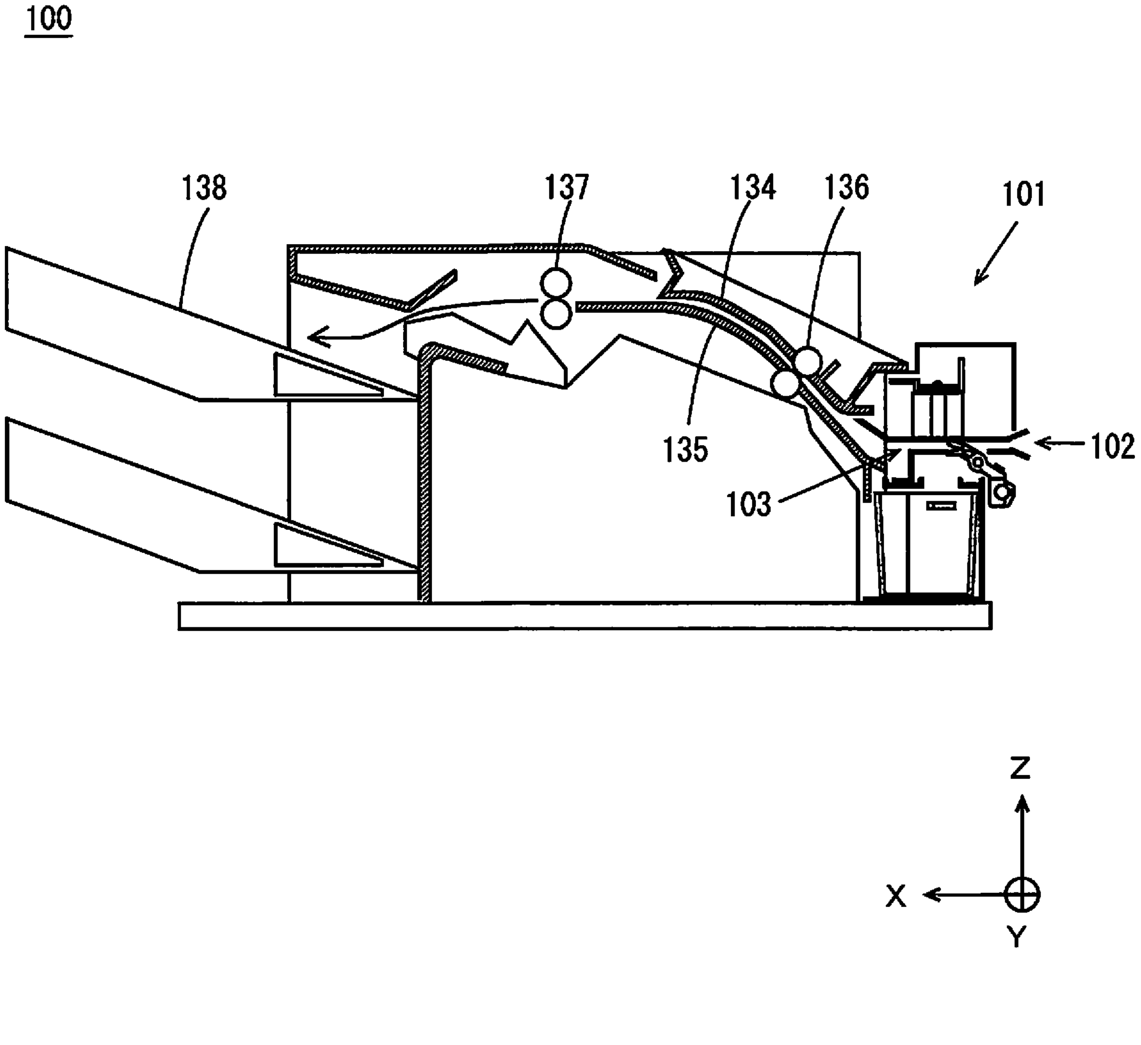
FIG. 3 is a diagram showing the inner configuration of a post-processing apparatus in an enlarged manner.

FIG. 3 is a diagram showing the inner configuration of a post-processing apparatus in an enlarged manner. With reference to FIG. 3, the post-processing apparatus 100 includes a punch unit 101, a first upper guide plate 134, a first lower guide plate 135, a pair of forward-reverse rollers 136, a pair of discharge rollers 137 and a sheet ejection tray 138.

The punch unit 101 includes a reception port 102 through which a sheet on which an image is formed is received from the image forming section 3, and a discharge port 103 through which a sheet is discharged.

The first upper guide plate 134 and the first lower guide plate 135 face each other in an up-and-down direction and are arranged at a predetermined distance from each other. Between the first upper guide plate 134 and the first lower guide plate 135, part of the conveyance path through which a sheet is conveyed is formed. The first lower guide plate 135 extends from below the discharge port 103 of the punch unit 101 to the pair of discharge rollers 137. The conveyance path formed between the first upper guide plate 134 and the first lower guide plate 135 extends from the discharge port 103 of the punch unit 101 to the pair of discharge rollers 137. In the conveyance path formed between the first upper guide plate 134 and the first lower guide plate 135, the pair of forward-reverse rollers 136 is arranged at a predetermined distance from the discharge port 103.

The pair of forward-reverse rollers 136 includes two columnar rollers. The two rollers are arranged side by side such that their rotationally symmetric axes are parallel to each other, and are arranged so as to be rotatable about their rotationally symmetric axes. The rotation shaft of one of the two rollers is biased toward the rotation shaft of the other roller. The pair of forward-reverse rollers 136 rotates about the rotation shafts when a rotational force of a motor is transmitted. The two rollers rotate in opposite directions. The rotational force of the motor may be transmitted to the two respective rollers, or the rotational force of the motor may be transmitted to one of the two rollers.

The motor that transmits a rotational force to the pair of forward-reverse rollers 136 rotates the pair of forward-reverse rollers 136 either in a forward direction or in a reverse direction. In a case in which the pair of forward-reverse rollers 136 rotates in the forward direction, a sheet is conveyed by the pair of forward-reverse rollers 136 in the direction directed from the punch unit 101 toward the pair of discharge rollers 137. In a case in which the pair of forward-reverse rollers 136 rotates in the reverse direction, a sheet is conveyed by the pair of forward-reverse rollers 136 in the direction directed from the pair of discharge rollers 137 toward the punch unit 101.

The pair of discharge rollers 137 includes two columnar rollers. The two rollers are arranged side by side such that their rotationally symmetric axes are parallel to each other, and are arranged so as to be rotatable about their rotationally symmetric axes. The rotation shaft of one of the two rollers is biased toward the rotation shaft of the other roller. The pair of discharge rollers 137 rotates about their rotation shafts when a rotational force of the motor is transmitted. The two rollers rotate in opposite directions. The rotational force of the motor may be transmitted to the two respective rollers, or the rotational force of the motor may be transmitted to one of the two rollers.

A sheet discharged from the image forming section 3 enters the punch unit 101 from the reception port 102, enters the conveyance path formed between the first upper guide plate 134 and the first lower guide plate 135 through the discharge port 103 and reaches the pair of forward-reverse rollers 136. The sheet that has reached the pair of forward-reverse rollers 136 is conveyed by the pair of forward-reverse rollers 136. The pair of forward-reverse rollers 136 rotates in the forward direction and then rotates in the reverse direction, so that the sheet is positioned in the punch unit 101, and a perforation is formed by the punch unit 101. Thereafter, the pair of forward-reverse rollers 136 rotates in the forward direction, so that the sheet reaches the pair of discharge rollers 137. The sheet conveyed by the pair of discharge rollers 137 is discharged to the sheet ejection tray 138.

Figure 4:
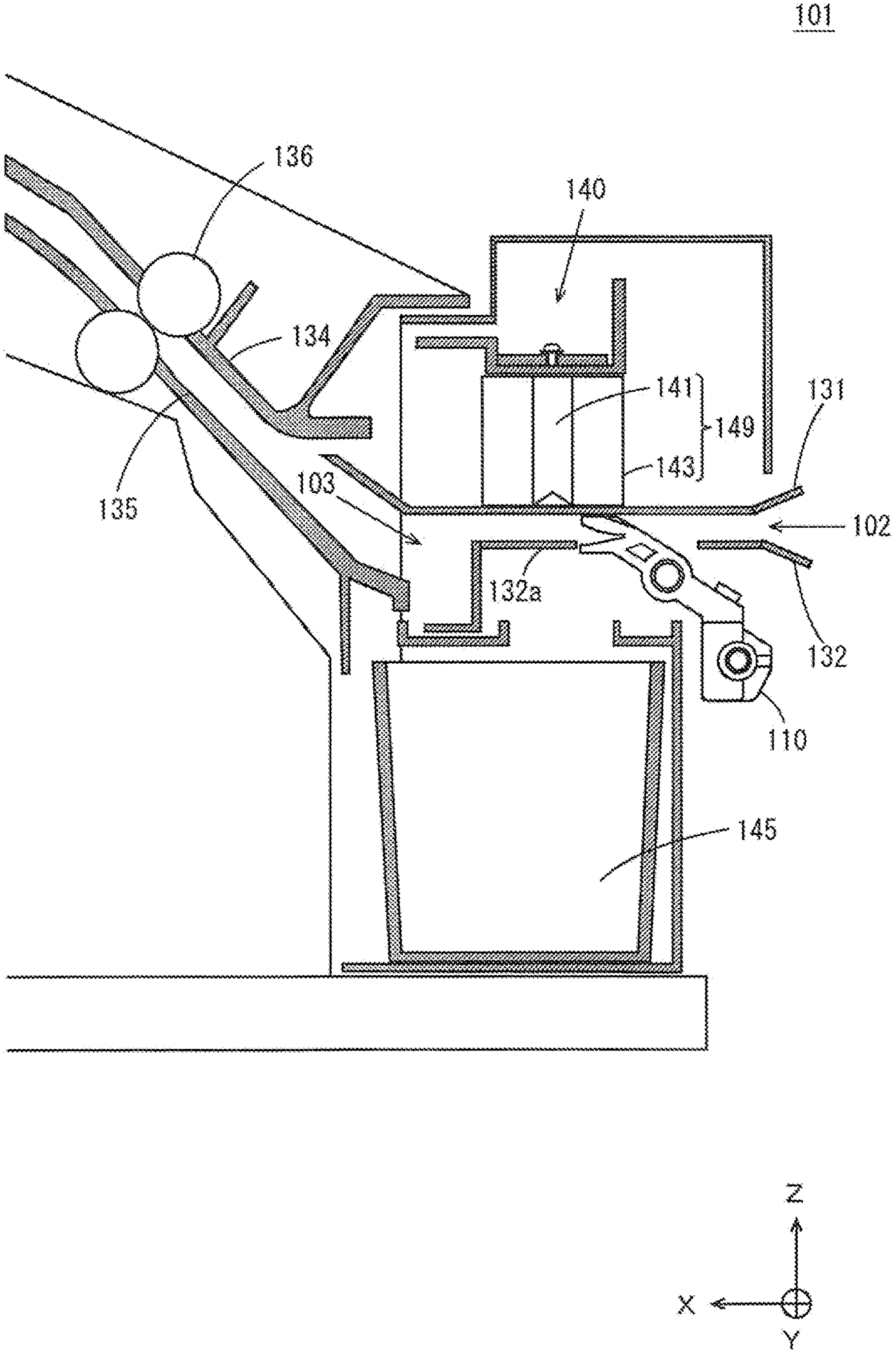
FIG. 4 is a first cross sectional view showing the punch unit and its vicinity in an enlarged manner.

FIG. 4 is a first cross sectional view showing the punch unit and its vicinity in an enlarged manner. With reference to FIG. 4, the punch unit 101 includes a second upper guide plate 131, a second lower guide plate 132, two restricting members 110, a punch mechanism 140 and a scrap storage 145 arranged below the punch mechanism 140. The scrap storage 145 is a box that has a rectangular parallelepiped shape and an open upper portion. The scrap storage 145 stores scraps that are generated when the punch mechanism 140 punches a sheet and fall from the punch mechanism 140.

The punch mechanism 140 is a processing member that punches a sheet, and has a punch upper portion 149 and an opposing plate 132*a*. The punch upper portion 149 and the opposing plate 132*a* are arranged opposite to each other with the sheet conveyance path interposed therebetween. The punch upper portion 149 is arranged farther upwardly than the conveyance path, and the opposing plate 132*a* is arranged below the conveyance path. The punch upper portion 149 includes a plurality of cylindrical punch shafts 141 having punch blades formed at their tips, a cam plate 143 in which a cam groove is formed and a drive mechanism that moves the cam plate 143. The plurality of punch shafts 141 are respectively provided so as to be reciprocatable in the direction parallel to one direction with the axial center being parallel to the one direction. In the present embodiment, the one direction is the vertical direction, and the four punch shafts 141 are provided. All of the four punch shafts 141 have the same configuration. A slide member extending in the direction orthogonal to an axial center is coupled to the punch shaft 141. The slide member has a columnar shape, and the rotationally symmetric axis of the slide member is orthogonal to the axial center of the punch shaft 141.

The cam plate 143 is a flat plate having a reference surface parallel to the axial center of the punch shaft 141, and a cam groove orthogonal to the reference surface is formed in the cam plate 143. The slide member is inserted into the cam groove formed in the cam plate 143. The width of the cam groove in the direction (vertical direction) parallel to the axial center of the punch shaft 141 is equal to or slightly larger than the outer diameter of the slide member. The cam plate 143 is provided so as to be reciprocatable in the horizontal direction in the plane parallel to the axial center of the punch shaft 141, that is, the Y direction in the present embodiment, and reciprocates due to the drive mechanism. The drive mechanism includes a combination of the motor serving as a driving source and a rack and pinion mechanism. When the cam plate 143 reciprocates in the horizontal direction in the plane parallel to the axial center of the punch shaft 141 due to the drive mechanism, the slide member coupled to the punch shaft 141 slides in the cam groove. Thus, the punch shaft 141 reciprocates in the direction parallel to the axial center. In the present embodiment, the punch shaft 141 is a movable portion the axial center of which reciprocates in the direction parallel to the vertical direction. Further, as the punch shaft 141 is lowered, the opposing plate 132*a* is lifted to support a sheet, and the punch shaft 141 passes through a through hole 142 formed in the opposing plate 132*a*, whereby the sheet is punched.

The second upper guide plate 131 and the second lower guide plate 132 face each other in the up-and-down direction and are arranged at a predetermined distance from each other. Between the second upper guide plate 131 and the second lower guide plate 132, part of the conveyance path through which a sheet is conveyed is formed. The second upper guide plate 131 and the second lower guide plate 132 extend from the reception port 102 to the discharge port 103 of the punch unit 101. In the second upper guide plate 131, an opening through which the punch shaft 141 can enter is formed at a position opposite to the punch shaft 141.

The two restricting members 110 are arranged side by side in the Y direction at a predetermined distance from each other at positions closer to the reception port 102 than the punch shaft 141 in a side view. The restricting member 110 includes a bearing 112. The bearing 112 is connected to a rotation shaft 123, so that the restricting member 110 is attached so as to be rotatable about the rotation shaft 123. The rotation shaft 123 is fixed to the frame of the punch unit 101 so as to be parallel to the Y direction.

Figure 5:
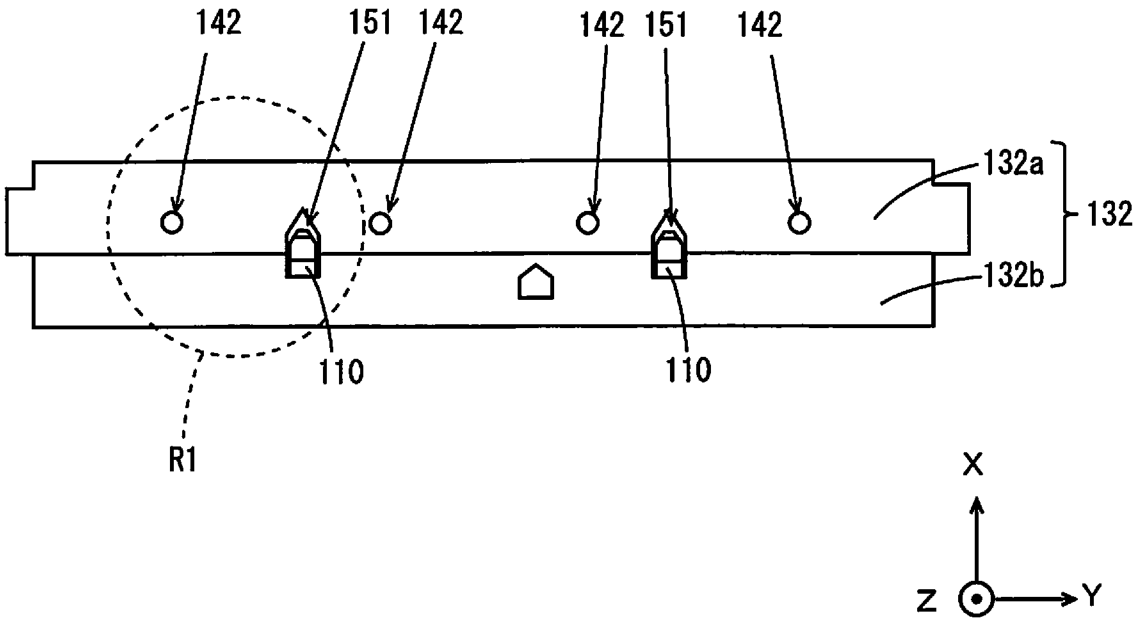
FIG. 5 is a plan view of a second lower guide plate.

FIG. 5 is a plan view of a second lower guide plate. With reference to FIGS. 4 and 5, the second lower guide plate 132 includes the opposing plate 132*a* and an inclined plate 132*b*. The opposing plate 132*a* is a flat plate made of metal. The inclined plate 132*b* is made of resin and has a flat plate shape. In a side view, the opposing plate 132*a* is arranged in the horizontal direction, and the inclined plate 132*b* is inclined to be farther away from the conveyance path in the direction directed from the discharge port 103 toward the reception port 102.

In the second lower guide plate 132, four circular through holes 142 that engage with punch blades and two openings 151 are formed. The four through holes 142 are formed in the opposing plate 132*a* to be arranged side by side in the Y direction at the positions respectively opposite to the four punch shafts 141. Each through hole 142 is located on the extension line of the axial center of each punch shaft 141. The two openings 151 are arranged side by side in the Y direction at a predetermined distance from each other, and are formed to extend across the opposing plate 132*a* and the inclined plate 132*b* at positions respectively opposite to the two restricting members 110.

The opposing plate 132*a* is movable upwardly and downwardly. During a period in which the punch shafts 141 are lifted, the upper surface of the opposing plate 132*a* is located at a position equal to or slightly lower than the highest position of the upper surface of the inclined plate 132*b*. As the punch shafts 141 are lowered, the opposing plate 132*a* is lifted.

Figure 6:
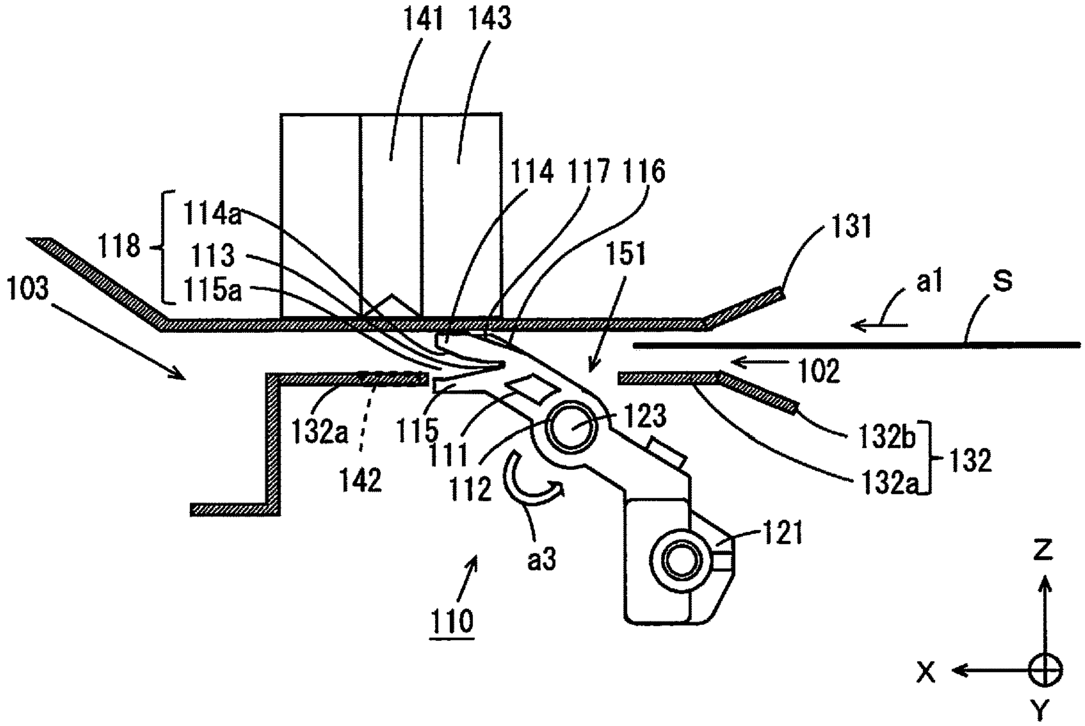
FIG. 6 is a first cross sectional view showing a restricting member and its vicinity in an enlarged manner.

FIG. 6 is a first cross sectional view showing the restricting member and its vicinity in an enlarged manner. FIG. 6 shows the restricting member 110 having a first posture. The restricting member 110 includes a first member 111 and a second member which are arranged with the bearing 112 interposed therebetween. The shapes and weights of the first member 111 and the second member 121 are defined such that the rotational moment of the first member 111 generated by a gravitational force is smaller than the rotational moment of the second member 121 generated by a gravitational force.

The first member 111 has an upper jaw portion 114 and a lower jaw portion 115 at its end portion opposite to the bearing 112. Further, in the first member 111, an abutment surface 113 is formed between the upper jaw portion 114 and the lower jaw portion 115. The upper jaw portion 114 and the lower jaw portion 115 respectively have an upper guide surface 114*a* and a lower guide surface 115*a* facing each other. The abutment surface 113 is located between the end portion of the upper guide surface 114*a* close to the bearing 112 and the end portion of the lower guide surface 115*a* close to the bearing 112. The abutment surface 113, the upper guide surface 114*a* and the lower guide surface 115*a* constitute a holding surface 118.

The restricting member 110 can change its posture between the first posture in which the holding surface 118 closes the conveyance path and the second posture in which a clearance is formed in at least part of the conveyance path by rotating about the rotation shaft 123.

FIG. 6 shows the restricting member 110 having the first posture. When the restricting member 110 has the first posture, the upper guide surface 114*a* is formed to extend along the conveyance path and be inclined toward the lower jaw portion 115, and is formed to be a curved surface that projects toward the lower jaw portion 115 in a side view. When the restricting member 110 has the first posture, the lower guide surface 115*a* is formed to extend along the conveyance path and be inclined toward the upper jaw portion 114.

In the upper jaw portion 114, an engagement surface 117 and a sliding surface 116 are formed on the opposite side to the upper guide surface 114*a*. When the restricting member 110 has the first posture, the engagement surface 117 is formed to be a flat surface extending along the conveyance path from the end portion of the upper jaw portion 114 opposite to the bearing 112. When the restricting member 110 has the first posture, the engagement surface 117 abuts against the second upper guide plate 131. The sliding surface 116 is a flat surface extending from the end portion of the engagement surface 117 close to the bearing 112, and is a flat surface extending along the conveyance path and inclined toward the lower jaw portion 115 when the restricting member 110 has the first posture. Therefore, the engagement surface 117 and the sliding surface 116 intersect with each other at a predetermined angle.

When the restricting member 110 has the first posture, the distance between the abutment surface 113 and the punch shaft 141 in the X direction is a predetermined distance.

A sheet S enters the punch unit 101 from the reception port 102, advances in the direction indicated by the arrow a1 in FIG. 6 and abuts against the sliding surface 116 of the restricting member 110. The restricting member 110 having the first posture rotates because the sliding surface 116 receives the force directed in the direction of the arrow a1, and changes the posture to the second posture.

Figure 7:
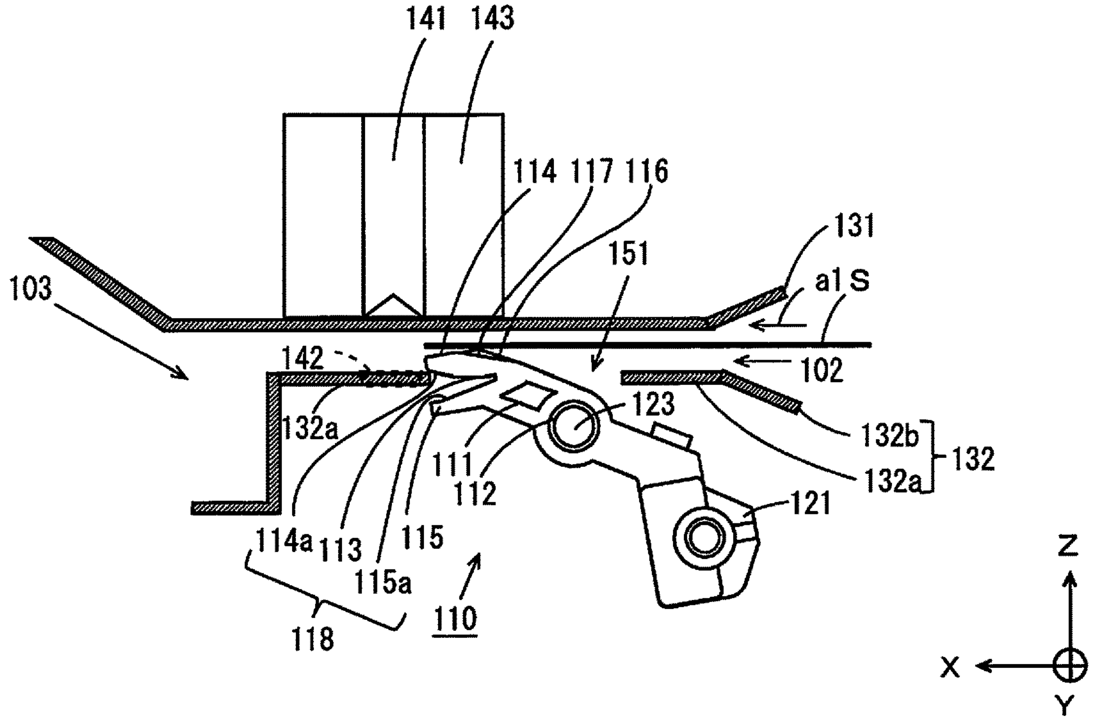
FIG. 7 is a second cross sectional view showing the restricting member and its vicinity in an enlarged manner.

FIG. 7 is a second cross sectional view showing the restricting member and its vicinity in an enlarged manner. FIG. 7 shows the restricting member 110 having the second posture. With reference to FIG. 7, in a case in which the restricting member 110 has the second posture, a clearance through which the sheet S can pass is formed between the second upper guide plate 131 and the engagement surface 117 of the restricting member 110. Therefore, the sheet S is conveyed to the pair of forward-reverse rollers 136 in the direction of the arrow a1.

The pair of forward-reverse rollers 136 conveys the sheet S in the direction of the arrow a1 until the rear end of the sheet S passes through the restricting member 110. When the rear end of the sheet S has passed through the restricting member 110, the restricting member 110 no longer receives a force from the sheet S and thus rotates due to its own weight to return to have the first posture.

The pair of forward-reverse rollers 136 rotates in the reverse direction after the sheet S has passed through the restricting member 110, and conveys the sheet in the direction indicated by the arrow a2 until the sheet abuts against the abutment surface 113. In a case in which the restricting member 110 has the first posture, the holding surface 118 closes the conveyance path. Therefore, the tip of the sheet is guided by the upper guide surface 114*a* or the lower guide surface 115*a* and abuts against the abutment surface 113. Thus, the sheet S is positioned.

Figure 8:
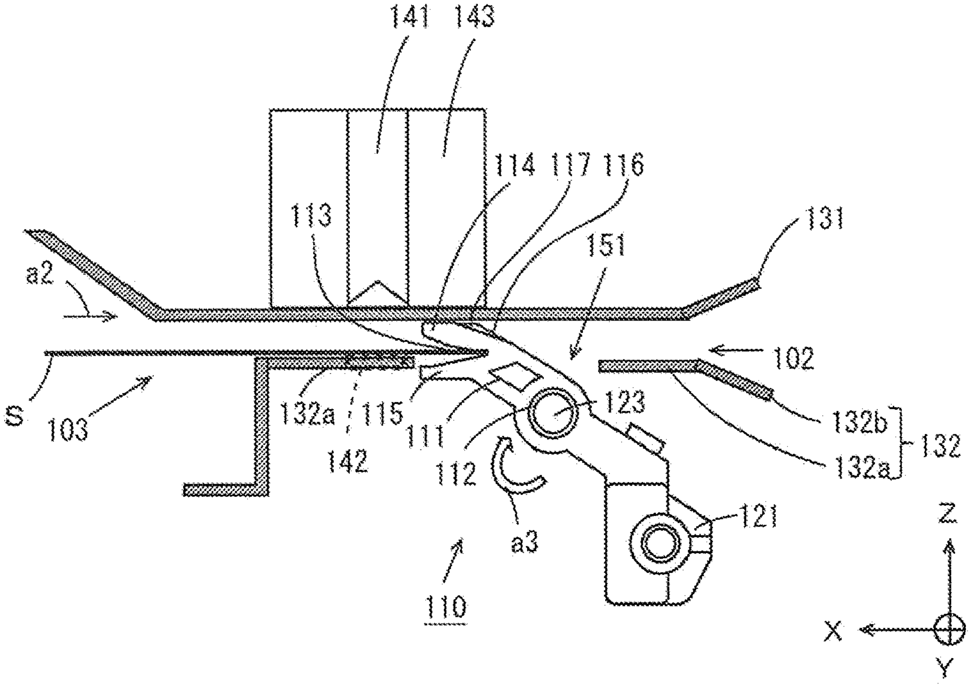
FIG. 8 is a third cross sectional view showing the restricting member and its vicinity in an enlarged manner.

FIG. 8 is a third cross sectional view showing the restricting member and its vicinity in an enlarged manner. With reference to FIG. 8, the sheet S abutting against the abutment surface 113 is shown. Because the distance between the abutment surface 113 and the punch shaft 141 in the X direction is predetermined, the sheet S is positioned with respect to the punch shaft 141. In this state, the punch shaft 141 is lowered.

Figure 9:
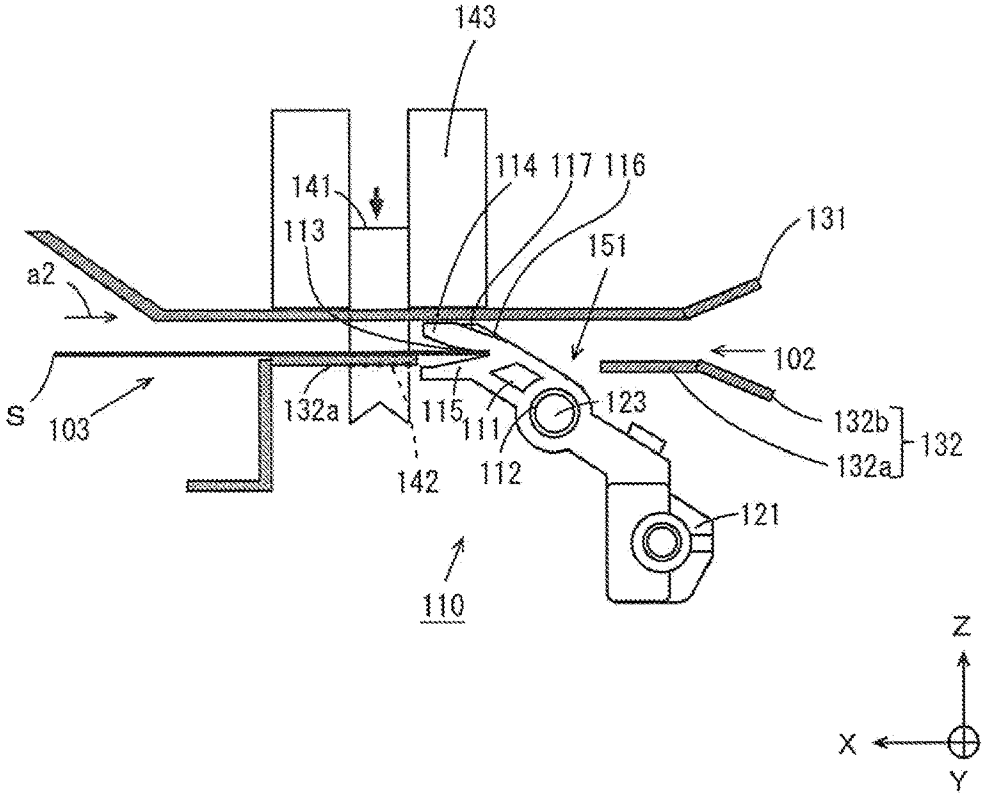
FIG. 9 is a fourth cross sectional view showing the restricting member and its vicinity in an enlarged manner.

FIG. 9 is a fourth cross sectional view showing the restricting member and its vicinity in an enlarged manner. With reference to FIG. 9, with the sheet supported due to the upward movement of the opposing plate 132*a*, the punch shaft 141 is lowered, penetrates the sheet S and passes through the through hole 142 formed in the opposing plate 132*a*. Thus, the sheet S is punched, and scraps fall.

Figure 10:
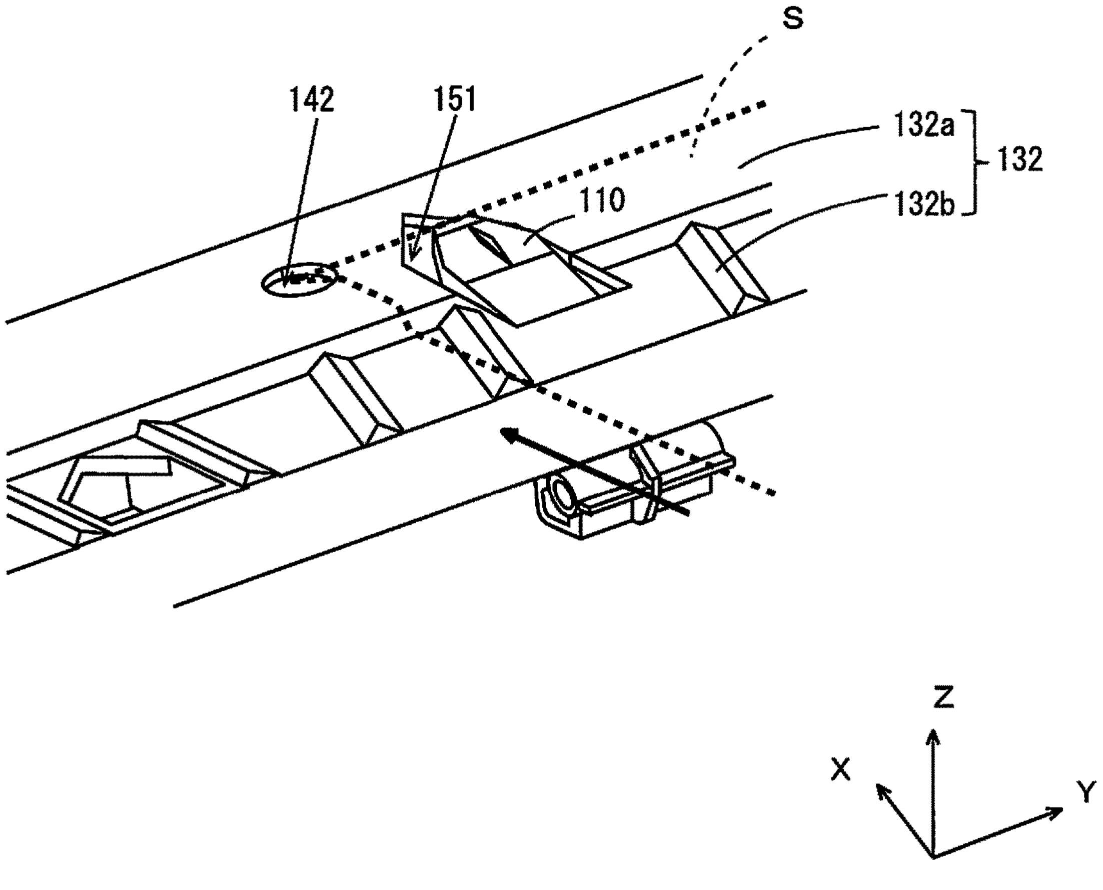
FIG. 10 is a perspective view showing a region R1 of FIG. 5 in an enlarged manner.

FIG. 10 is a perspective view showing a region R1 of FIG. 5 in an enlarged manner. With reference to FIG. 10, because the sheet S is biased in the direction away from the second lower guide plate 132 by the restricting member 110, the tip of the sheet S does not come into contact with the through hole 142 formed in the opposing plate 132*a*. Therefore, it is possible to prevent the entry of the sheet S into the through hole 142 when the sheet S is conveyed through the conveyance path and to prevent the jamming of the sheet S.

Figure 11:
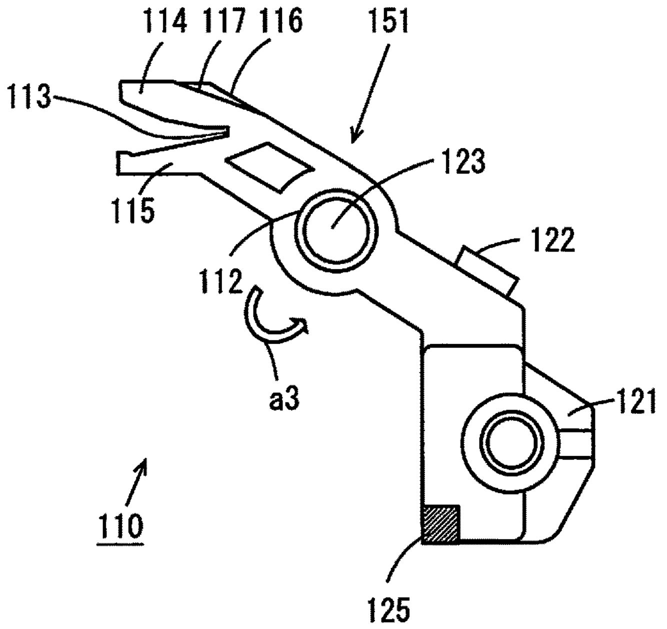
FIG. 11 is a front view of the restricting member having a first posture.

FIG. 11 is a front view of the restricting member having a first posture. With reference to FIG. 11, a photoelectric sensor 125 is provided to correspond to the restricting member 110 having the first posture. The photoelectric sensor 125 includes a light emitter that emits light and a light receiver that receives the light emitted by the light emitter.

When the restricting member 110 has the first posture, part of the second member 121 is located between the light emitter and the light receiver. Therefore, in the photoelectric sensor 125, the light emitted by the light emitter is not received by the light receiver.

Figure 12:
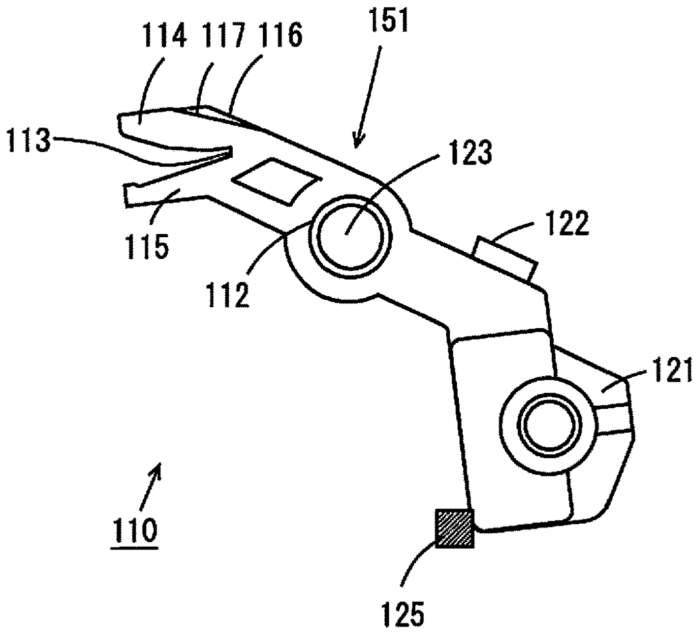
FIG. 12 is a front view of the restricting member having a second posture.

FIG. 12 is a front view of the restricting member having a second posture. With reference to FIG. 12, when the restricting member 110 has the second posture, the second member 121 is not located between the light emitter and the light receiver of the photoelectric sensor 125. Therefore, in the photoelectric sensor 125, the light emitted by the light emitter is received by the light receiver.

Therefore, the posture of the restricting member 110 can be detected based on the output of the photoelectric sensor 125. Further, based on a change in posture of the restricting member 110, it is possible to detect that the sheet S has passed through the restricting member 110. A controller that controls a drive motor for rotating the pair of forward-reverse rollers 136 controls the drive motor based on the output of the photoelectric sensor 125 to rotate the pair of forward-reverse rollers 136 in the forward direction or in the reverse direction. The controller is a central processing unit (CPU) or a microprocessor, for example.

Figure 13:
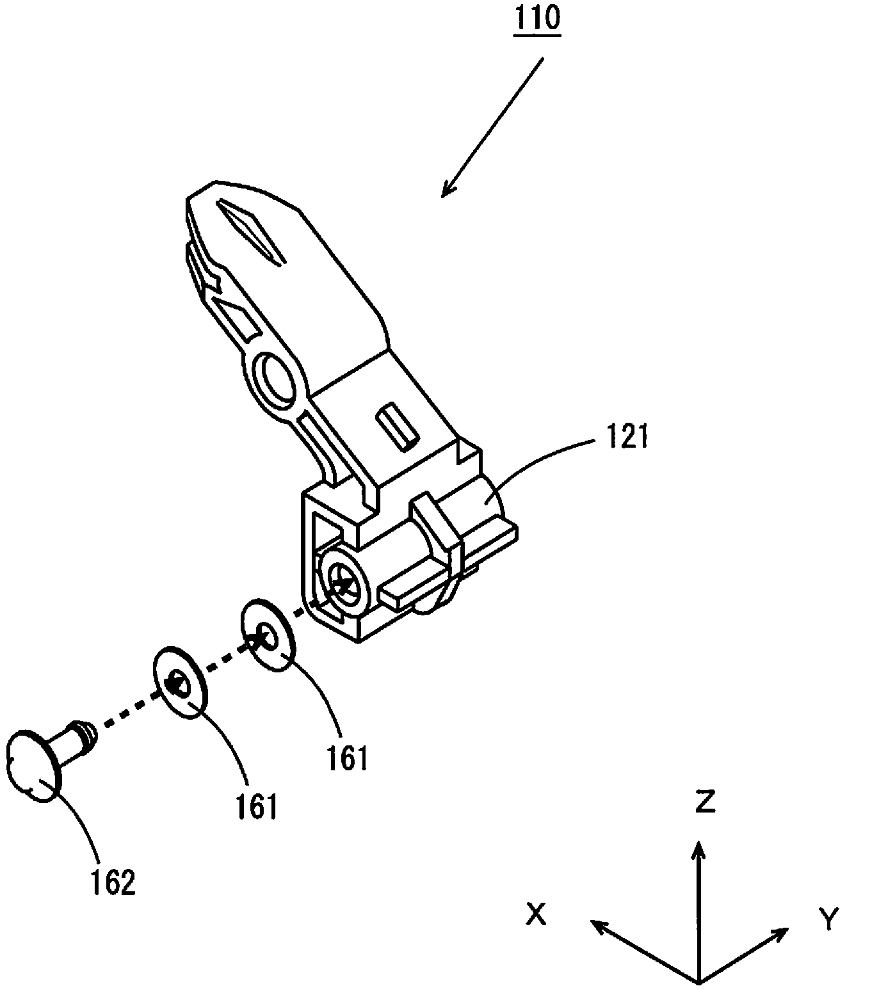
FIG. 13 is a perspective view of the restricting member.

FIG. 13 is a perspective view of the restricting member. With reference to FIG. 13, the restricting member 110 has a weight adjusting member 161 that adjusts the rotational moment of the second member 121. The weight adjusting member 161 is attached to an end portion of the second member 121 in the direction parallel to the rotation axis of the bearing 112 by a screw 162. Therefore, even when the weight adjusting member 161 is attached, the size of the restricting member 110 increases in the direction parallel to the rotation axis of the bearing 112 but does not increase in other directions. Therefore, the degree of freedom in the arrangement of the restricting member 110 is improved.

The number of the weight adjusting members 161 is determined according to the rotational moment of the second member 121. In the present example, the two weight adjusting members 161 are attached. The larger the distance from the bearing 112, the more preferable the position to which the screw 162 of the second member is attached.

Modification Example

Figure 14:
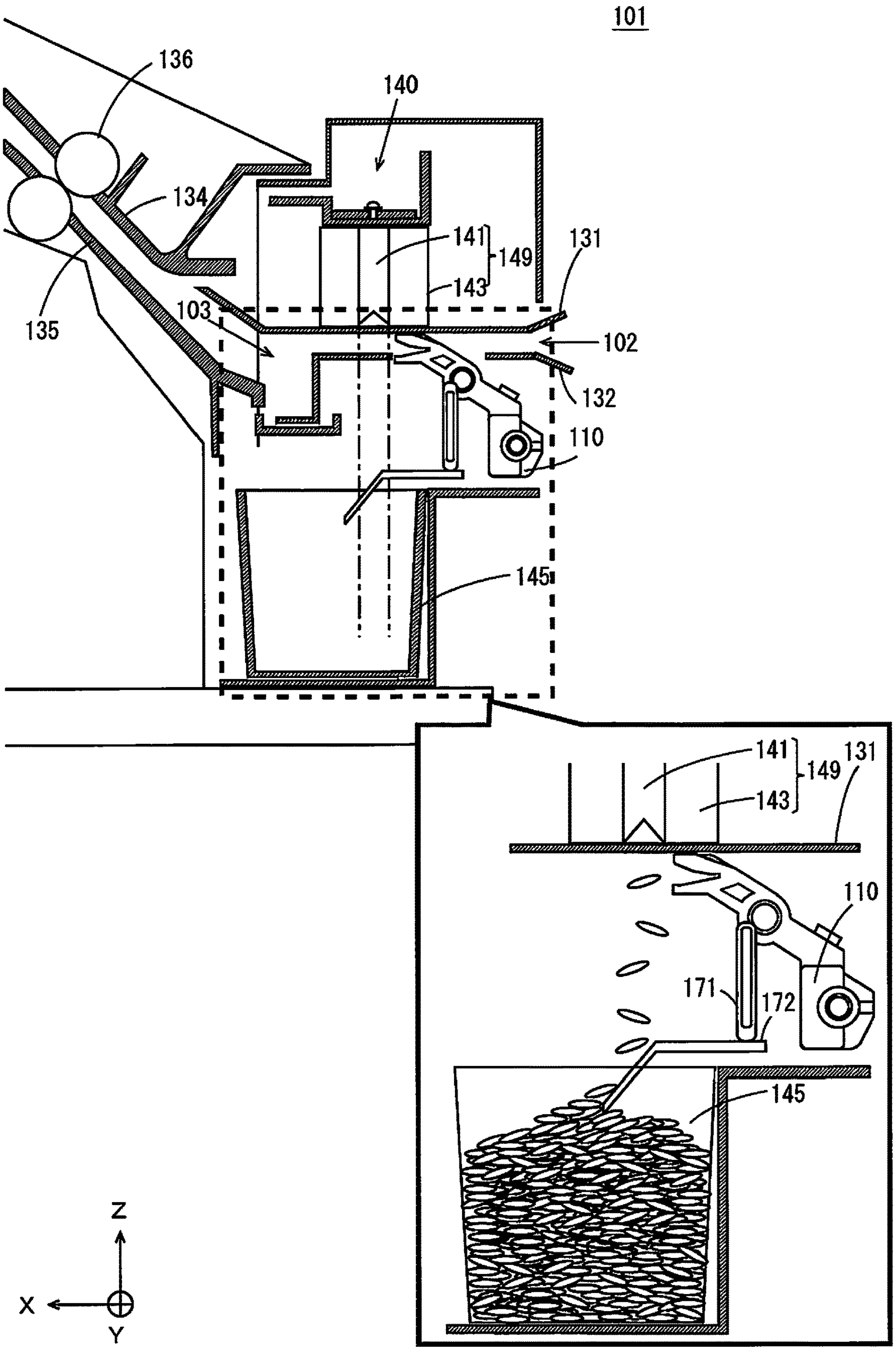
FIG. 14 is a first cross sectional view showing a punch unit and its vicinity in a modification example in an enlarged manner.
Figure 15:
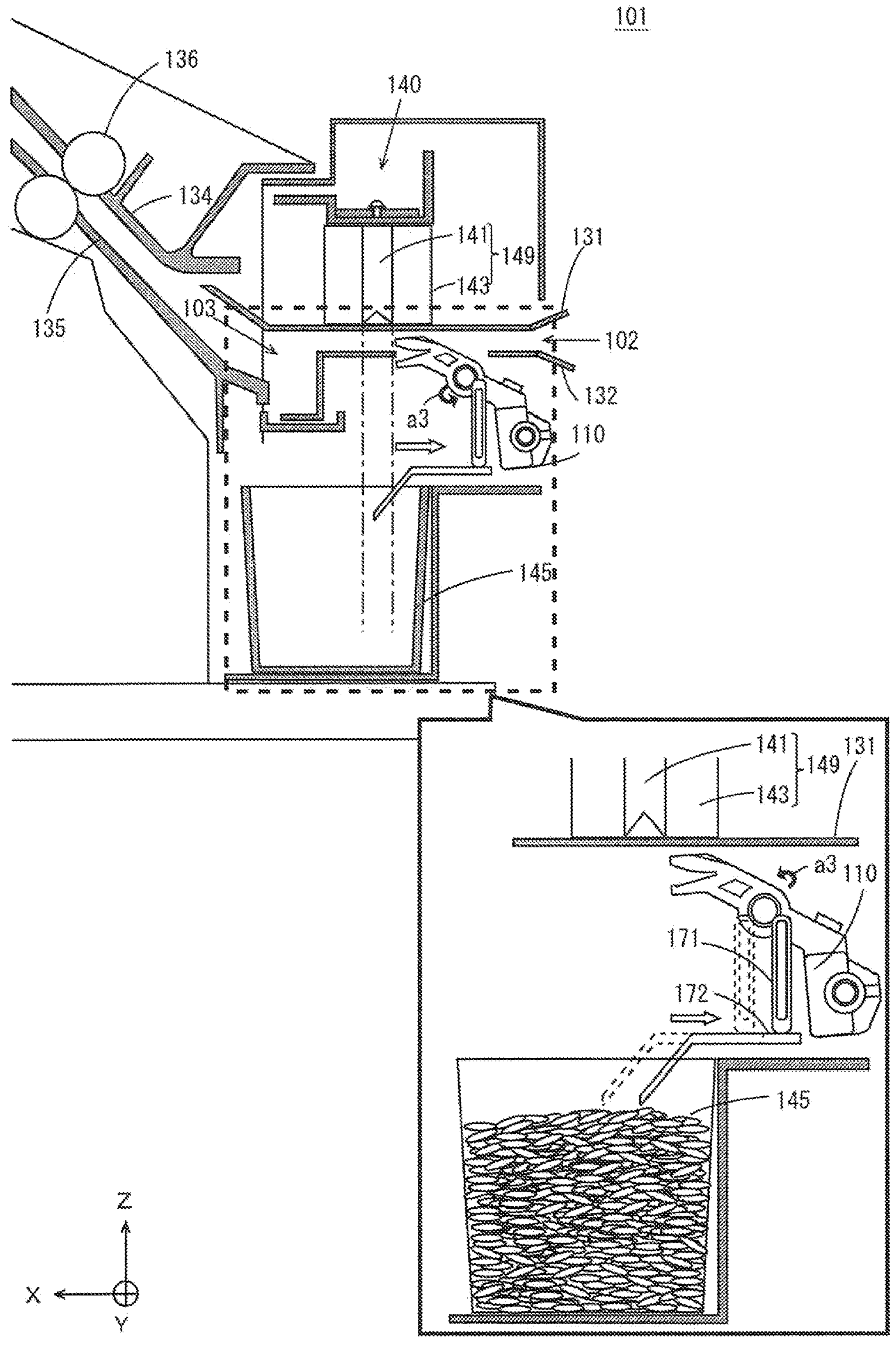
FIG. 15 is a second cross sectional view showing the punch unit and its vicinity in the modification example in an enlarged manner.

FIGS. 14 and 15 are cross sectional views showing a punch unit and its vicinity in a modification example in an enlarged manner. FIG. 14 shows a restricting member 110 having the first posture. FIG. 15 shows the restricting member 110 having the second posture.

With reference to FIGS. 14 and 15, the punch unit 101 in the modification example includes a leveling member 171 attached to the restricting member 110. The leveling member 171 is attached to the restricting member 110 at a predetermined distance from a bearing 112. The leveling member 171 has a surface intersecting with the extension line of the punch shaft 141 below the punch shaft 141.

The position of the leveling member 171 in the X direction in a case in which the restricting member 110 has the first posture is different from the position of the leveling member 171 in the X direction in a case in which the restricting member 110 has the second posture. Therefore, each time the restricting member 110 changes its posture between the first posture and the second posture, the leveling member 171 moves in the X direction.

Because the leveling member 171 has the surface intersecting with the extension line of the punch shaft 141 below the punch shaft 141, scraps that are generated when the punch shaft 141 punches a sheet fall on the leveling member 171. Therefore, the scraps can uniformly fall into the scrap storage 145.

Further, in a case in which the top of a scrap pile in the scrap storage 145 rises, the scrap pile is taken down by the movement of the leveling member 171 in the X direction. This can increase an amount of scraps that can be stored in the scrap storage 145.

Although the punch mechanism 140 is described as one example of the processing member in the present embodiment, the processing member may be another device that processes a sheet, such as a stapler that staples a sheet.

Overview of Embodiments (Item 1) A post-processing apparatus includes a movable portion and an opposing portion that are arranged to be opposite to each other with a conveyance path through which a sheet is conveyed interposed between the movable portion and the opposing portion, and a restricting member that has a holding surface including an abutment surface against which a sheet abuts, is capable of changing a posture between a first posture in which the holding surface closes the conveyance path and a second posture in which a clearance is formed in at least part of the conveyance path and is attached to a side where the opposing portion is located with respect to the conveyance path, wherein the movable portion processes a sheet positioned at the abutment surface by the restricting member having the first posture by moving toward the opposing portion.

According to this aspect, the processing member has the movable portion and the opposing portion that are arranged opposite to each other with the conveyance path interposed therebetween, and the restricting member that has the holding surface including the abutment surface against which a sheet abuts is attached close to the opposing portion with respect to the conveyance path to be capable of changing the posture between the first posture in which the holding surface closes the conveyance path and the second posture in which a clearance is formed in at least part of the conveyance path. Because the size of the movable portion in the sheet conveyance direction is larger than that of the opposing portion, the size of the restricting member in the conveyance direction can be reduced as compared with a case in which the restricting member is attached close to the movable portion, and the size of the post-processing apparatus in the conveyance direction can be prevented from increasing. Further, the clearance that is formed in the conveyance path in a case in which the restricting member has the second posture is close to the movable portion. Therefore, because the sheet passing through the clearance moves away from the opposing portion, it is possible to prevent the sheet from abutting against the opposing portion.

As a result, it is possible to provide the post-processing apparatus that prevents jamming of a sheet.

(Item 2) The post-processing apparatus according to item 1, wherein the restricting member is rotatable about a rotation shaft which is parallel to the conveyance path and orthogonal to a sheet conveyance direction, and has a first portion and a second portion arranged to be opposite to each other with the rotation shaft interposed between the first portion and the second portion, and has the first posture in a state of receiving only a gravitational force from external.

According to this aspect, the restricting member switches the posture between the first posture and the second posture by rotating about the rotation shaft, and switches to have the first posture in a state of receiving only a gravitational force from external. Therefore, it is possible to reduce a force applied to the restricting member as much as possible in order to change the posture of the restricting member from the first posture to the second posture.

(Item 3) The post-processing apparatus according to item 2, wherein the abutment surface is formed at the first portion, and the post-processing apparatus further includes a weight adjusting member attachable to and detachable from an end portion of the second portion in a direction parallel to the rotation shaft.

According to this aspect, because the weight adjusting member is mounted to the end portion of the second portion in the direction parallel to the rotation shaft, the size of the restricting member in the sheet conveyance direction can be prevented from increasing. In addition, the rotational moment of the second portion can be easily adjusted.

(Item 4) The post-processing apparatus according to item 2 or 3, wherein the restricting member has an inclined surface, with the restricting member having the first posture, that faces in a direction opposite to a direction in which the abutment surface faces and is inclined with respect to the sheet conveyance direction.

According to this aspect, because a sheet conveyed through the conveyance path abuts against the inclined surface of the restricting member having the first posture, the posture of the restricting member is changed to the second posture as the sheet is moved. Therefore, it is not necessary to include a power source for changing the posture of the restricting member, so that the configuration of the apparatus can be simplified.

(Item 5) The post-processing apparatus according to item 4, further comprising a conveyor that conveys a sheet in a first direction, and conveys the sheet in a second direction opposite to the first direction after the sheet has passed through the restricting member.

According to this aspect, during a period in which a sheet conveyed in the first direction passes through the restricting member, the restricting member is pressed by the sheet to have the second posture. When the sheet has passed through the restricting member, the restricting member changes to have the first posture. Thereafter, when being conveyed in the second direction, the sheet abuts against the abutment surface of the restricting member. Therefore, the rear end of the sheet conveyed in the first direction can be positioned.

(Item 6) The post-processing apparatus according to any one of items 2 to 5, wherein the restricting member is attached below the conveyance path, and the post-processing apparatus further includes a leveling member that is attached to the restricting member at a predetermined distance from the rotation shaft and has a surface intersecting with an extension line of the movable portion below the movable portion.

According to this aspect, because being attached to the restricting member at a predetermined distance from the rotation shaft, the leveling member moves according to a change in posture of the restricting member. Further, the leveling member has the surface intersecting with the extension line below the movable portion, so that it is possible to increase the area in which scraps generated when a sheet is processed by the processing member are accumulated.

(Item 7) The post-processing apparatus according to any one of items 1 to 6, further includes a sensor having a light emitter and a light receiver, wherein at least part of the restricting member is located between the light emitter and the light receiver when the restricting member has either one of the first posture and the second posture, and the restricting member is spaced apart from a position between the light emitter and the light receiver when the restricting member has another posture.

According to this aspect, because the posture of the restricting member is detected by the sensor, it is possible to detect whether the sheet has passed through the restricting member.

Although embodiments of the present invention have been described and illustrated in detail, the disclosed embodiments are made for purpose of illustration and example only and not limitation. The scope of the present invention should be interpreted by terms of the appended claims

What is claimed is:

1. A post-processing apparatus comprising:

a movable portion and an opposing portion that are arranged to be opposite to each other with a conveyance path through which a sheet is conveyed interposed between the movable portion and the opposing portion; and a restricting member that has a holding surface including an abutment surface against which a sheet abuts, is capable of changing a posture between a first posture in which the holding surface closes the conveyance path and a second posture in which a clearance is formed in at least part of the conveyance path, and is attached below the conveyance path such that conveyance force exerted by a sheet on the restricting member lowers the holding surface to the second posture, in which clearance is formed in at least part of the conveyance path, from the first posture, in which the restricting member is in a state of receiving only gravitational force from external, wherein the movable portion processes a sheet positioned at the abutment surface by the restricting member having the first posture by moving toward the opposing portion.

2. The post-processing apparatus according to claim 1, wherein the restricting member is rotatable about a rotation shaft which is parallel to the conveyance path and orthogonal to a sheet conveyance direction, and has a first portion and a second portion arranged to be opposite to each other with the rotation shaft interposed between the first portion and the second portion.

3. The post-processing apparatus according to claim 2, wherein the abutment surface is formed at the first portion, and the post-processing apparatus further includes a weight adjusting member attachable to and detachable from an end portion of the second portion in a direction parallel to the rotation shaft.

4. The post-processing apparatus according to claim 2, wherein the restricting member has an inclined surface, with the restricting member having the first posture, that faces in a direction opposite to a direction in which the abutment surface faces and is inclined with respect to the sheet conveyance direction.

5. The post-processing apparatus according to claim 4, further comprising a conveyor that conveys a sheet in a first direction, and conveys the sheet in a second direction opposite to the first direction after the sheet has passed through the restricting member.

6. The post-processing apparatus according to claim 2, wherein the restricting member is attached below the conveyance path, and the post-processing apparatus further includes a leveling member that is attached to the restricting member at a predetermined distance from the rotation shaft and has a surface intersecting with an extension line of the movable portion below the movable portion.

7. The post-processing apparatus according to claim 1, further comprising a sensor having a light emitter and a light receiver, wherein at least part of the restricting member is located between the light emitter and the light receiver when the restricting member has either one of the first posture and the second posture, and the restricting member is spaced apart from a position between the light emitter and the light receiver when the restricting member has another posture.

* * * * *